United States Patent [19]

Korte et al.

[11] Patent Number: 5,393,845
[45] Date of Patent: Feb. 28, 1995

[54] PROCESS FOR THE PRODUCTION OF LOW MOLECULAR WEIGHT ACRYLONITRILE POLYMERS AND THEIR USE

[75] Inventors: Siegfried Korte; Heinrich Alberts, both of Odenthal; Branislav Böhmer, Walsrode; Werner Karstens; Wolfgang Koch, both of Bomlitz; Hans-Günter Poersch-Panke; Klaus Szablikowski, both of Walsrode, all of Germany

[73] Assignee: Wolff Walsrode AG, Walsrode, Germany

[21] Appl. No.: 168,609

[22] Filed: Dec. 16, 1993

[30] Foreign Application Priority Data

Dec. 23, 1992 [DE] Germany ............................. 4243783

[51] Int. Cl.⁶ ............................................. C08F 8/12
[52] U.S. Cl. ................................. 525/369; 525/329.1; 525/329.2
[58] Field of Search .......................................... 525/369

[56] References Cited

U.S. PATENT DOCUMENTS 2,812,317 11/1957 Barrett ................................. 525/369
3,758,449 9/1973 Hoppe et al. ...................... 525/329.1

FOREIGN PATENT DOCUMENTS 46573 8/1981 European Pat. Off. .
135727 8/1984 European Pat. Off. .
185458 11/1985 Euroepan Pat. Off. .
2373566 12/1977 France .

Primary Examiner—Bernard Lipman
Attorney, Agent, or Firm—Sprung Horn Kramer & Woods

[57] ABSTRACT

The invention relates to a process for the continuous production of polyacrylonitrile hydrolyzates and to their use as dispersion and grinding aids for pigments and fillers, such as for example kaolin, $CaCO_3$ or gypsum.

3 Claims, No Drawings

PROCESS FOR THE PRODUCTION OF LOW MOLECULAR WEIGHT ACRYLONITRILE POLYMERS AND THEIR USE

This invention relates to a process for the continuous production of polyacrylonitrile hydrolyzates and to their use as dispersion and grinding aids for pigments and fillers, such as for example kaolin, $CaCO_3$ or gypsum.

The products obtained by the alcoholic or acidic hydrolysis of polyacrylonitriles and acrylonitrile copolymers have various applications. For example, they are used as fluid loss additives in oil production and as emulsifiers or protective colloids in emulsion or precipitation polymerizations. In addition, polyacrylic acids obtained from acrylonitrile polymers by hydrolysis and salts thereof are widely used as auxiliaries for waterbased pigment and filler dispersions. Low molecular weights are advantageous for these applications.

Polyacrylonitrile hydrolyzates are prepared in known manner by polymerization of acrylonitrile and subsequent acidic or alkaline hydrolysis. According to the prior art, the low molecular weights required for the dispersing properties are obtained by the use of redox initiator systems in the presence of water/isopropanol mixtures on the principle of precipitation polymerization or, as described in "Colloid and Polymer Science" 256 (1978), page 1027, in dimethyl formamide as the reaction medium.

Several methods have been described for the production of low molecular weight polyacrylonitriles and acrylonitrile copolymers.

U.S. Pat. No. 2,763,636 describes a solution polymerization process for the production of low molecular weight potyacrylonitriles having molecular weights Mv in the range from about 2,000 to 30,000. The polymerization is carried out in concentrated aqueous zinc chloride solutions using peroxides as catalysts. Complicated purification of the polyacrytonitrile is necessary after precipitation.

DE-PS 26 55 714 describes a process for the production of low molecular weight polyacrylonitriles, in which the polymerization is carried out discontinuously in mixtures of isopropanol and water using hydrogen peroxide and hydroxyl amine or hydrazine salts as the redox system. Before the polyacrylonitriles thus produced are further processed to dispersion and emulsification aids by hydrolysis, they have to be isolated and freed from the toxic residues or reaction products of the reducing agent, hydroxyl amine, by treatment with water.

Another process for the production of polyacrylonitriles having low K values, i.e. low molecular weights, is known from EP 0 135 727, according to which inter alia starting products for emulsifiers, dispersants, deposition inhibitors for deep drilling and oil production are produced by continuous or discontinuous precipitation polymerization using a redox system of persulfate, pyrosulfate and Mohr's salt in aqueous medium. Because of the high content of inorganic salts from the redox system, the polyacrylonitrile has to be isolated by filtration or centrifugation and washing with water. The products required for the hydrolysis can only be obtained in this way.

The described processes for the production of low molecular weight polyacrylonitriles are a significant source of wastewater pollution.

EP 0 047 381 describes an advantageous ecologically safe process for the production of water-soluble hydrolysis products of polyacrylonitrile hydrolyzates. The products obtained by this process may be used as protective colloids, refining agents for cellulose products and/or as starting products for adhesives and sizing agents.

Where the polyacrylonitrile hydrolyzates prepared in accordance with EP 0 047 381 are used as dispersants and/or pigment distributors for preventing gelation and for reducing the viscosity of mineral suspensions, only hydrolyzates of sufficiently low molecular weight may be used.

Such products can only be obtained from the resulting hydrolyzates according to EP 0 047 381 by degradation with hydrogen peroxide in accordance with the teaching of EP-A 0 175 116.

It is known from EP 0 129 329 and EP 0 185 458 that, in addition to a sufficiently low molecular weight, a narrow molecular weight distribution, expressed by the polydispersity $Mw/Mn$ or non-uniformity $U=(Mw/Mn)-1$, of the polymeric auxiliary is required for the dispersion and grinding of mineral suspensions.

Accordingly, the problem addressed by the present invention was to provide fine-particle acrylonitrile polymers having low molecular weights and a narrow molecular weight distribution in the form of aqueous suspensions or emulsions which could be directly hydrolyzed without any need for uneconomical and/or ecologically unsafe working-up processes and which would provide auxiliaries for the dispersion and grinding of mineral substances with the required properties.

According to the invention, it is possible by continuous precipitation polymerization in water/isopropanol mixtures in the presence of peroxides to produce acrylonitrile polymers or copolymers of acrylonitrile which, without having to be isolated, are converted into water-soluble products for the dispersion and grinding of mineral suspensions in a continuous hydrolysis process without any change in the distribution characteristic determined in advance in the starting product polyacrylonitrile or the copolymers.

Accordingly, the present invention relates to a process for the production of water-based dispersion and grinding aids by hydrolysis of polyacrylonitriles and acrytonitrile copolymers, characterized in that acrylonitrile polymers having average molecular weights Mw of 1,000 to 20,000, a molecular non-uniformity U of 0.3 to 2.0 and a content of terminal hydroxypropyl groups exceeding 0.5 units per molecule, obtained by continuous polymerization in water/isopropanol mixtures, are used as starting materials and, without isolation, are converted into water-soluble polyacrylic acid salts in a continuous hydrolysis process without any change in the distribution characteristic determined in advance in the starting material.

The polyacrylonitriles and acrylonitrile copolymers according to the invention referably have a molecular weight Mw in the range from 2,000 to 15,000 and a molecular non-uniformity $U=Mw/Mn-1$ of 0.3 to 2.0 and, more particularly, a molecular weight in the range from 2,000 to 10,000 and a non-uniformity of 0.5 to 1.5.

The molecular weights and the molecular nonuniformity were determined by gel permeation chromatography. Calibration was carried out by the "broad standard" method. Dimethyl formamide containing 1.0% by weight lithium chloride is used as eluent.

Any compounds copolymerizable with acrylonitrile may be used as the comonomers. Monomers which promote the hydrolysis of the nitrile group in the polyacrylonitrile are preferred. (Meth)acrylamide, methyl acrylate and (meth)acrylic acid are particularly preferred in this regard. Monomers which withstand the hydrolysis unchanged are also preferred. Among this group of monomers, styrene, styrene sulfonic acid and vinyl sulfonic acid are particularly preferred.

Another preferred group of copolymerizable compounds are monomers which, after the hydrolysis of the acrylonitrile copolymer, introduce additional functional groups into the polyacrylonitrile hydrolyzate. Vinyl acetate is particularly preferred in this regard.

The polyacrylonitriles and acrylonitrile copolymers are produced by the process of continuous precipitation polymerization. The monomer concentration may be from 10 to 40% by weight and is preferably from 20 to 35% by weight, based on the total quantities of monomers, isopropanol and water introduced in the same unit of time. Organic and inorganic peroxides, persulfates and azo compounds and also mixtures thereof may be used as initiator in concentrations of 0.5 to 8.0% by weight, based on the quantity of monomers introduced in the same unit of time. Persulfates in concentrations of 1.0 to 6.0% by weight are preferred. It is particularly preferred to use ammonium persulfate in concentrations of 2.0 to 6.0% by weight.

The isopropanol content influences the molecular weight and may be varied from 5.0 to 50.0% by weight, based on the total quantities of monomers, water and isopropanol introduced in the same unit of time. Isopropanol concentrations of 10.0 to 30.0% by weight are preferred. The pH value of the aqueous reaction medium may vary over a wide range. pH values of 2.0 to 8.0 can be optimal, depending on the initiator used.

pH values in the range from 2.5 to 4.0 have proved to be advantageous for the particularly preferred use of ammonium persulfate.

In the continuous precipitation polymerization of the acrylonitrile in water/isopropanol mixtures, typical regulators effective in radical polymerization may also be used to control the molecular weights and include, for example, organic compounds containing thiol and disulfide groups or enol ethers of aliphatic, particularly cycloaliphatic, aldehydes. Alkenes copolymerized to only a limited extent with acrylonitrile are also suitable, but show high transfer activity. Within the group of $C_{3-18}$ alkenes, propene, butene and isobutene are preferred.

Using regulators such as these, the molecular weights of the acrylonitrile polymers and the hydrolysis products obtained therefrom can be further reduced or, alternatively, kept at the low level required by saving initiator components.

The optimal reaction temperature is also dependent on the type of initiator used and may vary from 60° to 120° C. Where ammonium persulfate is used as the initiator, reaction temperatures in the range from 80° to 120° C. are preferred. The average residence time of the monomers in the reaction mixture during the polymerization reaction may be between 1 and 6 h and is preferably between 1 and 3 h.

Depending on the monomer concentration selected and the average residence time, the volume/time yield of polymerization by the process according to the invention ranges from 17 to 400 and preferably from 67 to 350 g/l-h and is thus higher than the volume/time yield claimed, for example, in EP 0 135 727.

It has proved to be advisable to carry out the polymerization in an inert gas atmosphere.

The polyacrylonitriles and acrylonitrile copolymers produced in accordance with the invention with molecular weights Mw of 1,000 to 20,000 are distinguished by a very low molecular non-uniformity U of 0.3 to 2.0.

These low non-uniformities are only achieved if the individual feed rates of monomer or monomer mixture, initiator solution and isopropanol are measured very exactly. In addition, the reaction mixture has to be continuously discharged from the polymerization reactor. Deviations from the preset value of more than 1% lead to greater non-uniformities than those claimed in accordance with the invention. The polymers produced in accordance with the invention are further distinguished by a content of terminal hydroxypropyl groups exceeding 0.5 units per molecule.

The polyacrylonitriles and acrylonitrile copolymers used in the process according to the invention are free from ionic terminal groups. Thus, the —$OSO_3Na$ groups typically formed from the persulfate initiator cannot be detected either.

The special structural features of the products mentioned above promote their processing in the hydrolysis process. They are also very much responsible for the surprisingly favorable property profile of the grinding and dispersion aids produced.

After stripping of the isopropanol and the monomer residues, the acrylonitrile polymers produced in accordance with the invention may be exposed to the conditions of an acidic or alkaline hydrolysis. It is advisable to carry out stripping of the isopropanol and any monomer residues continuously and to return the stripping products continuously to the polymerization process.

Alkaline hydrolysis is preferred to acidic hydrolysis because it is known to give higher conversions as reflected, for example, in the residual nitrogen content of the hydrolysis products. The degree of hydrolysis, i.e. the ratio between the number of carboxylate groups after hydrolysis and the number of hydrolyzable groups used (nitrile, methyl carboxylate, etc.), is dependent upon the alkali/polymer ratio and upon the hydrolysis time and the hydrolysis temperature. Molar ratios of alkali to the sum total of hydrolyzable groups of 0.5 to 1.1 are preferred, ratios of 0.9 to 1.05 being particularly preferred. Suitable alkalis are the alkali metal and alkaline earth metal hydroxides and mixtures thereof. NaOH, KOH and $Ca(OH)_2$ are preferred, NaOH being particularly preferred.

The hydrolysis is carried out continuously at temperatures in the range from 120° to 220° C. and preferably at temperatures in the range from 160° to 200° C. over periods of 0.1 to 3 h and preferably over periods of 0.5 to 1.0 h.

The invention is illustrated by the following Examples.

EXAMPLES

Process for the Production of Dispersion and Grinding Aids from Lower Molecular Weight PAN Hydrolyzates A 40 liter capacity V4A autoclave equipped with an anchor impeller stirrer, three metering units and a discharge gate for continuous operation in the excess pressure range is charged with the following components as the starting phase:

11.4 kg deionized water, 6.83 kg isopropanol, 0.45 kg 1N sulfuric acid, 0.83 kg acrylonitrile and 4.65 kg polyacrylonitrile (average molecular weight Mw=5,500 g/mol).

After the contents of the reactor have been heated at 80° C., the polymerization is initiated by addition of 92 g ammonium persulfate dissolved in 385 g water.

|  | Starting phase (A) | Experimental setup | |
|---|---|---|---|
|  |  | (B) Example 1 | (C) Example 2 |
| Solution I (g/h) |  |  |  |
| Isopropanol | 2990 | 2990 | 5980 |
| Acrylonitrile | 3450 | 3450 | 6904 |
| Solution II (g/h) |  |  |  |
| Deionized water | 5470 | 2840 | 11350 |
| Ammonium persulfate | 310 | 80.5 | 208 |
| Solution III (g/h) |  |  |  |
| Deionized water | / | 2840 | / |
| $H_2O_2$ (35% in water) | / | 19.5 | / |
| Av. res. time (h) | 3.0 | 3.0 | 1.5 |
| Feed time (h) | 6.0 | 30.0 | 15.0 |

Solutions I and II are uniformly introduced into the starting phase (A). After 1 hour, a filling of approx. 95% is reached in the reactor. A quantity of polymer suspension corresponding to the feed streams (approx. 12.2 kg/h) is then removed overhead. A timer-controlled pressure lock is used for this purpose, its filling volume being gauged in such a way that, under the described conditions, the pressure inside the reactor can be adjusted to 4 to 5 bar with very short timing intervals (~30 seconds).

During the continuous operation of the reactor, the reaction temperature is increased in stages from 80° to 89° C. over a period of 5 hours. The feed is then changed over to the experimental setup (B), an eqilibrium state characterized by the following data being established after another 10 hours.

|  | Experimental setup | |
|---|---|---|
|  | (B) Example 1 | (C) Example 2 |
| Conversion (% by weight) based on monomer input | 77.0 | 86.0 |
| Average particle size [μm] | 12.0 | 13.0 |
| $n_{rel}$ (1% in DMAC) | 1.27 | 1.21 |
| Molecular weights (g/mol) |  |  |
| Mw | 7010 | 5870 |
| Mn | 3560 | 3110 |
| Non-uniformity $U = \frac{Mw}{Mn} - 1$ | 0.97 | 0.89 |

For experimental setup (C), the continuous reactor is started up as described above. After the necessary reaction temperature of 89° C. has been established, the continuous process is switched to the experimental conditions mentioned in (C). Approx. 24.4 kg/h polymer suspension are discharged. A stationary equilibrium state is reached after approx. 5 h. The low molecular weight polyacrylonitrile obtained by filtration or concentration by evaporation has the characteristic data indicated in the overview under (C).

The polymer suspension obtained in the experimental setup (B) and (C) (Example 1) is continuously freed from unreacted acrylonitrile and isopropanol in a column fitted with sieve or bubble plates. The column is operated under a pressure of approx. 600 mbar. After the composition has been determined, acrylonitrile and isopropanol distilled off may be continuously returned to the polymerization process.

The solids concentration of the polymer suspension is determined at the bottom of the column by density measurement. The result of this measurement is used to control the quantity of sodium hydroxide required for the subsequent hydrolysis step.

Hydrolysis takes place continuously in a tube reactor over an average residence time of 30 minutes at a temperature of 185° C. A pressure of approx. 28 bar is established under these conditions. The ammonia formed during the hydrolysis is removed in a stripping column at the end of the hydrolysis reactor. Distillation of the ammonia is carried out in such a way that ammonia in the form of a 25% aqueous solution is obtained at the head of the column while the hydrolyzed polymer with the following data is obtained at the bottom of the column.

|  | Example 1 | Example 2 |
|---|---|---|
| Residual nitrogen (% by weight) | 0.02 | 0.03 |
| Solids concentration (% by weight) | 44.2 | 41.8 |
| Molecular weights (g/mol) |  |  |
| Mw | 5230 | 4025 |
| Mn | 2750 | 2160 |
| Non-uniformity $U = \frac{Mw}{Mn} - 1$ | 0.90 | 0.86 |

The molecular weights were measured by gel permeation chromatography. The following conditions were selected:

| Columns | Polymer Shodex AD802-5 | Hydrolyzate Shodex S804 |
|---|---|---|
| Eluent | DMAC + 0.5% LiCl | Deionized $H_2O$ + 0.9% NaCl + 0.02% $NaN_3$ |
| Flow rate | 0.6 ml/min. | 0.6 ml/min. |
| Detection | Refractometer | Refractometer |

After alkaline hydrolysis, the polyacrylonitriles described in Example 1 and Example 2 give dispersion and grinding aids characterized by favorable performance properties.

We claim:

1. A process for the production of a water-soluble polymer predominantly containing carboxylate groups, which comprises preparing by continuous precipitation polymerization in a water/isopropanol mixture using a persulfate initiator, a polyacrylonitrile or acrylonitrile copolymer containing at least about 80% by weight of acrylonitrile units and having an average molecular weight Mw in the range from about 1,000 to 20,000 g/mol, a molecular non-uniformity of 0.3 to 2.0 and a content of terminal hydroxypropyl groups exceeding 0.5 units per molecule, removing the isopropanol to leave a suspension of the polymer with an average particle size of about 5 to 50 μm obtained after removal of the isopropanol, and subjecting the suspension to continuous hydrolysis in the presence of about 50 to 110 mol-% of an alkali metal hydroxide over an average residence time of about 6 to 180 minutes at a temperature of about 120° to 220° C.

2. A process according to claim 1, wherein the precipitation polymerization is effected in the presence of a polymerization regulator.

3. A process according to claim 1, wherein the polymer is a polyacrylonitrile copolymer containing up to 20% by weight of $C_{1-4}$ ester or amide of acrylic or methacrylic acid or of a vinyl carboxylic acid ester.

* * * * *